Dissolving 10 to 30 parts by weight of a metal phthalocyanine in concentrated sulfuric acid Adding 10 to 40 parts of a finely divided conductive material Precipitating of the metal phthalcyanine onto the conductive material by pouring of the concentrated sulfuric acid solution with the undissolved conductive material into 5 times its volume of cold water Drying the mass at a temperature of about 110°C Mixing the mass with 5 to 20 parts of an organic polymeric binder and 20 to 70 parts of a water or acid soluble pore-forming material Subjecting the dry mixture to a temperature of about 150°C and a pressure of about 1000 kg/cm$^2$ Leaching out the pore-forming material with water or dilute acid

FIG. 2

United States Patent Office 3,778,313
Patented Dec. 11, 1973

3,778,313
METHOD OF MAKING AN OXYGEN ELECTRODE FOR FUEL CELLS
Harald Reber, Stuttgart-Feuerbach, Horst Jahnke, Gerlingen, and Walter Steiner, Stuttgart, Germany, assignors to Robert Bosch G.m.b.H., Stuttgart, Germany
Original application Oct. 23, 1967, Ser. No. 677,179, now abandoned. Divided and this application Mar. 3, 1971, Ser. No. 120,615
Claims priority, application Germany, Oct. 25, 1966, B 89,549
Int. Cl. H01m 13/00
U.S. Cl. 136—120 FC                  8 Claims

ABSTRACT OF THE DISCLOSURE

The oxygen electrode for use in a fuel cell is formed by dissolving 10 to 30 parts by weight of a metal phthalocyanine in concentrated sulfuric acid, adding 10 to 40 parts of a finely divided conductive material and causing precipitation of the solute onto the conductive material, drying the mass and mixing it with 5 to 20 parts of a binder and 20 to 70 parts of a pore-forming material and subjecting the dry mixture to heat and pressure followed by removal of the pore-forming material.

The electrode is acid resistant and can therefore be used in fuel cells operated with acidic electrolytes.

CROSS-REFERENCE TO RELATED APPLICATIONS

The present application is a division of application Ser. No. 677,179, now abandoned, filed by the same inventors on Oct. 23, 1967 in respect of "Oxygen Electrode for Fuel Cells and Method of Making the Same."

BACKGROUND OF THE INVENTION

The present invention is concerned with a process for making an oxygen electrode for a fuel cell operated with an acidic electrolyte.

A considerable variety of effective and relatively inexpensive oxygen electrodes are known for fuel cells which operate with an alkaline electrolyte.

However, great difficulties are encountered in producing oxygen electrodes for fuel cells which are operated with acidic electrolytes, such as 20–40% aqueous sulfuric acid, or 20–50% aqueous phosphoric acid or 10–30% hydrochloric acid, or ammonium salt solutions such as 25% aqueous ammonium chloride solution.

Most metallic and oxidic oxygen catalysts which are of sufficient stability in alkaline electrolytes cannot be used in combination with acidic electrolytes due to chemical dissolution of the active material. This is the case for instance with respect to nickel and silver catalysts as well as with respect to a great number of oxidic, salt-like and alloy catalysts. Only electrodes containing noble metals, nobler than silver, and primarily electrodes containing platinum metals could be successfully used up to now in fuel cells which are operated with acidic electrolyte. The high price and relative scarcity of these materials is a great impediment with respect to the use thereof in fuel cells which are operated with acidic electrolytes, although for other reasons there exists great interest in the latter. Thus, there is an urgent need to develop an acid-resistant oxygen-catalyst electrode which can be effectively used in fuel cells with acidic electrolytes and which may be produced in a relatively simple and economical manner.

It is therefore an object of the present invention to provide for a simple and economical process of making an oxygen electrode for fuel cells which is acid resistant at least to such extent that it may be used in fuel cells operated with an acidic electrolyte.

SUMMARY OF THE INVENTION

The oxygen electrode of the present invention is made by dissolving 10 to 30 parts by weight of a metal phthalocyanine in concentrated sulfuric acid, adding 10 to 40 parts of a finely divided conductive material and causing precipitation of the solute onto the conductive material, drying the mass and mixing it with 5 to 20 parts of a binder and 20 to 70 parts of a pore-forming material and subjecting the dry mixture to heat and pressure followed by removal of the pore-forming material.

BRIEF DESCRIPTION OF THE DRAWING

FIG. 2 is a flow sheet showing the consecutive steps of a preferred embodiment of the novel process.

DESCRIPTION OF THE PREFERRED EMBODIMENTS

Figure 1:
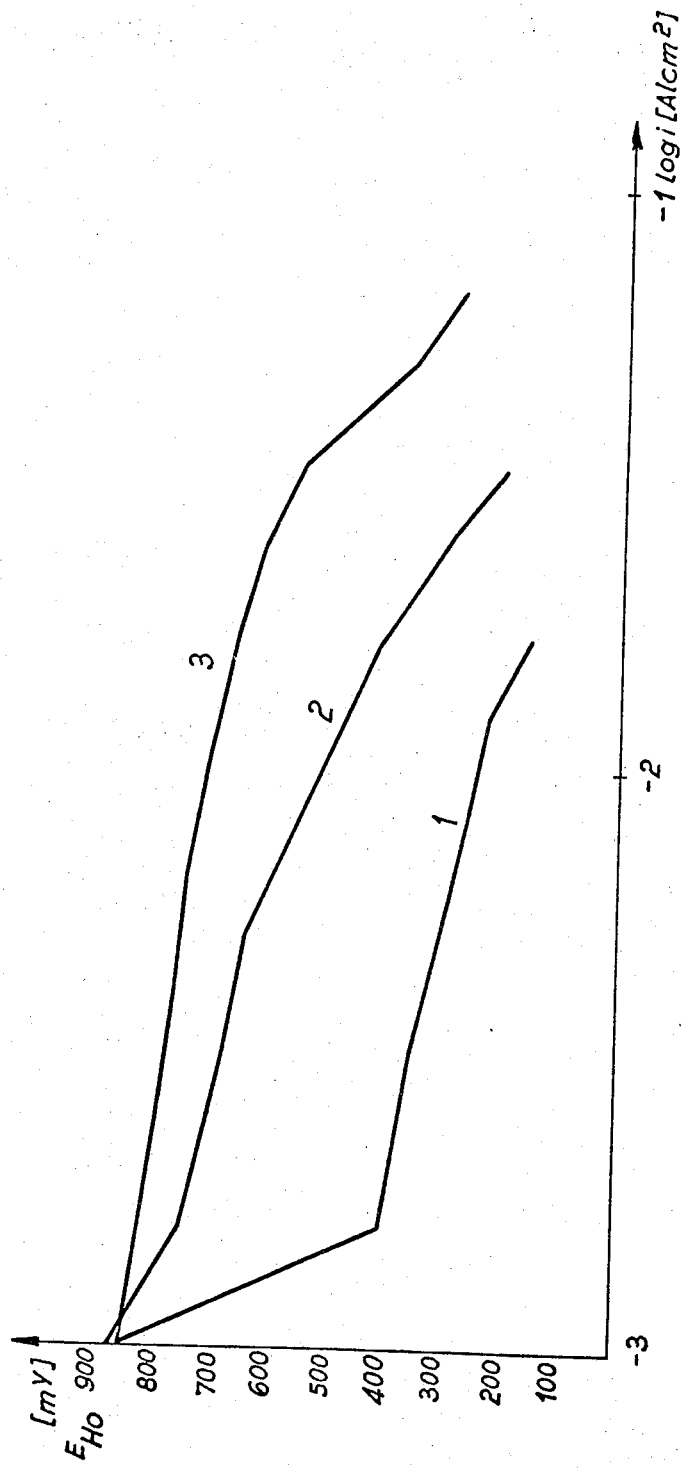
FIG. 1 of the drawing is a graphic illustration of the voltage characteristics of various oxygen electrodes.

The electrode made by the process of the invention essentially consists of a shape-retaining porous mixture of a thermoplastic binder material, an organic, semi-conductive material which is resistant against the acidic electrolyte and capable of catalyzing the electrochemical reaction in the fuel cell, and an electrically conductive material which is inert with respect to the acidic electrolyte.

Polystyrene, polyacrylonitrile, polyethylene and polytetrafluoroethylene are preferred thermoplastic binder materials which may be used in accordance with the present invention.

Suitable electrically conductive materials are gold and carbonaceous conductive materials such as graphite, acetylene black, oil coal and carbon fibers.

The organic, semi-conductive catalytic material which forms an essential part of the oxygen electrode is an organic compound which includes a plurality of conjugated double bond and, due to the presence of these double bonds, has an electric conductivity of at least $10^{-6}.\Omega^{-1}.\text{cm}^{-1}$.

Preferably, the semi-conductive, catalytic material will be a phthalocyanine, and very good results are achieved with high molecular weight cobalt and iron phthalocyanines.

According to a preferred manner of producing the oxygen electrode of the present invention, a 4-functional compound which may be a 4-functional aromatic nitrile or a 4-functional acid anhydride, is condensed with urea and a salt, preferably a cobalt or iron salt, and the thus obtained condensation product is dissolved in concentrated sulfuric acid. An electrically conductive carbonaceous material, or gold, is then contacted with the thus formed sulfuric acid solution. Upon adding water to the thus obtained mixture, the cobalt or iron phthalocyanine compound will be precipitated from the thus diluted sulfuric acid solution onto the gold or carbonaceous material.

Surprisingly, it has been found that certain metal-containing organic dye complexes of the phthalocyanine group are not only extraordinarily stable in diluted inorganic mineral acids but also possess the desired catalytic activity for oxygen reduction in a fuel cell.

However, since the electric conductivity of the normal, low molecular weight phthalocyanines is only between about $10^{-6}$ to $10^{-4}$ $\text{ohm}^{-7}$ $\text{cm}^{-7}$ and thus very low, it is necessary and provided according to the present invention to combine such catalysts for the purpose of producing oxygen electrodes, with an electrically conductive material which will be inert under the operating condition of the fuel cell.

Conductive carbon or graphite as well as gold have been found suitable as the electrically conductive component of the oxygen electrode and will increase the conductivity of the same above the conductivity of the phthalocyanines.

In order to form a shape-retaining body of the pulverulent active and conductive components of the oxygen electrode, thermoplastic organic highly polymerized materials such as polystyrene, polyacrylonitrile, polyethylene and polytetrafluoroethylene have been found to be excellently suitable binder materials. In addition, for producing the oxygen electrode, a pore-forming material must be included in the mixture in order to obtain electrodes which are permeable for gaseous oxygen.

The following examples are given as illustrative only without, however, limiting the invention to the specific details of the examples.

Example 1

A catalyst for use in the oxygen electrode of the present invention may be produced by dissolving for instance 1 part by weight of cobalt phthalocyanine in 19 parts by weight concentrated sulfuric acid (98%) and adding to the thus formed solution 1 part by weight of acetylene black. The thus formed mixture is then slowly poured under stirring into 5 liters of cold water. Over a period of about 12 hours, for instance over night, a precipitate is formed. The precipitate is then separated, for instance by filtration, washed until free of acid and then dried at 110° C.

2.5 grams of the thus-obtained acid-free, dry precipitate are mixed with 1.5 grams polyethylene powder and 4 grams of sodium sulfate having a particle size of between 71 and 160 microns. The oxygen electrode is then formed of the thus-obtained mixture and hardened at a temperature of 150° C. and at a pressure of 1000 kg./cm.$^2$. Thereafter, the pore-forming sodium sulfate is leached out with water and the electrode is then ready for use.

The electric characteristics of the thus-obtained electrode in a sulfuric acid electrolyte having a density of 1.28 grams per cubic centimeter at 22° C., are illustrated in the drawing, wherein curve 1 shows the voltage characteristics of such metal phthalocyanine electrode at 22° C.

In this case, regular cobalt phthalocyanine was used as the active component of the electrode. However, greatly improved characteristics are obtained if a high molecular derivative of the regular cobalt phthalocyanine is used. The molecular weight of such products may be higher than 1000 and the degree of polymerization may be at least 3.

Example 2

In order to obtain a high molecular weight metal phthalocyanine, a mixture of 66 parts by weight pyromellitic acid dianhydride, 19 parts by weight Co(OH)$_2$ and 2000 parts by weight of urea are heated with 1 part by weight ammonium molybdate (as catalyst for the reaction). Heating is carried out under stirring to a temperature of about 230° C. The reaction which takes place includes decomposition of the urea and for this reason preferably from time to time additional urea is added in order to maintain the reaction mixture in liquid condition.

After about 6 hours, stirring is terminated and the temperature raised to about 280° C. The thus-obtained solid reaction cake is maintained for an additional two hours at 280° C.

Thereafter, the reaction cake is cooled, broken up, for instance in a mortar, and washed with hot water.

The thus-obtained residue is dissolved in concentrated sulfuric acid and then precipitated in pure state by pouring of the concentrated sulfuric acid solution into 5 times its volume of water. Thereafter, the precipitate is filtered, washed until free of acid and dried at 110° C.

The thus-obtained catalyst is used for making the oxygen electrode as described in Example 1. Electrochemical determination of the effectiveness of the thus-obtained oxygen electrode is illustrated in FIG. 2 of the drawing. It is immediately apparent that the catalytic activity has been greatly improved over that obtained with the normal, non-polymerized cobalt phthalocyanine electrode.

Example 3

A comparison of the results obtained according to Examples 1 and 2 shows the improvement of the catalytic activity by utilizing a high molecular product in place of the non-polymerized phthalocyanine compound in an otherwise standard oxygen electrode.

The present example will serve to show the further improvement of electrodes with non-polymerized cobalt phthalocyanine catalyst if the electrode composition is adjusted to the optimum with respect to conductivity, pore volume, and type and proportion of binder material.

According to the present example, 5 grams of cobalt phthalocyanine are dissolved in 95 grams of concentrated (98%) sulfuric acid and stirred with 5 grams acetylene black. Precipitation of this phthalocyanine is accomplished by pouring of the acetylene black-containing mixture into an amount of cold water which is equal to 10 times the amount of the solution.

6 grams of the thus-obtained catalyst are worked up into a paste with 10 grams of a polystyrene dispersion in water, for instance the product commercially available under the trade name "Styrofan-Dispersion 1003 D," and 15 ml. water, and then dried at 90° C. The powder cake which has been obtained in this manner is then finely broken up and intimately mixed with two grams sodium bicarbonate having a particle size of about 140 microns. The electrode is then formed of the thus-obtained mixture and compressed at a pressure of 1000 kg./cm.$^2$. Thereafter, the compressed body is hardened under exclusion of air and without application of pressure at a temperature of 220° C. The sodium bicarbonate is then removed by leaching with highly diluted sulfuric acid at room temperature.

After washing, the thus-obtained electrode is ready for use.

The electrochemical characteristics of the thus-obtained oxygen electrode are illustrated in curve 3.

If the present example is repeated but under utilization of the high polymer product obtained as described in Example 2, the improvement may be about doubled.

Generally, the mixture of which the oxygen electrode of the present invention is formed will consist of between 10 and 30 parts by weight of the phthalocyanine compound, preferably between 15 and 25 parts by weight; between 10 and 40 parts by weight, preferably between 15 and 20 parts by weight of the electrically conductive component such as graphite or gold; between 5 and 20 parts by weight, preferably between 8 and 15 parts by weight of the thermoplastic binder material; and between 20 and 70 parts by weight, preferably between 45 and 55 parts by weight of the pore-forming material which after forming of the electrode structure is to be removed, for instance by leaching.

The pore volume of the oxygen electrode of the present invention preferably will be between 30% and 70% and most preferably between about 40 and 50% of the total volume of the electrode. The individual pore size will depend on the particle size of the pore-forming material and generally will be between 10 and 200 microns, preferably between 70 and 160 microns.

The organic semi-conductive materials which may be used as catalysts according to the present invention are compounds which due to a great number of conjugated double bonds in the molecule possess an electric conductivity of at least $10^{-6}.\Omega^{-1}.cm.^{-1}$.

Suitable phthalocyanines include those in which the central metal atom is one of the metal ions: Co$^{II}$-, Fe$^{II}$-, Fe$^{III}$-, Ni$^{II}$-, Cr$^{III}$-, Mn$^{II}$-, Mn$^{III}$-, Pd$^{II}$- and Pt$^{IV}$-.

Electrodes with other than cobalt as the metal are produced in a manner similar to that described in Example 1 with the main difference that in place of the cobalt phthalocyanine the corresponding other metal phthalocyanine taken from the above group is utilized.

Other metal phthalocyanines may also be produced as described in Example 2 by utilizing in place of 19 parts of cobalt hydroxide, an equivalent amount of the hydroxides, sulfates, chlorides, carbonates, acetates, nitrates or similar metal salts of the metal ions listed above.

Graphite or gold as the electrically conductive material may also be replaced by other electrically conductive carbonaceous materials such as acetylene black, oil coal or coal fibers. The particle size of the electrically conductive material may vary within wide limits and generally will be dependent upon the commercially available particle sizes within a size range of between about 0.1 and 100 microns.

The processes described in the examples may be varied by utilizing the metal salts of the cations and anions described hereinabove, as a replacement for the cobalt compound. Particularly good results are obtained with iron phthalocyanine. The electric characteristics correspond to those obtained with the cobalt compounds, however, the iron compounds can be produced in a more economical manner.

4-functional compounds which may be used for producing high molecular weight metal phthalocyanines are 4-functional aromatic nitriles and 4-functional acid anhydrides which are condensed with urea and the cobalt salt or other metal salt prior to dissolution in sulfuric acid as described above.

These 4-functional compounds include the following:

pyromellitic dianhydride
3,3',4,4'-diphenyl tetracarboxylic dianhydride
1,2,5,6-naphthalenetetracarboxylic dianhydride
2,2',3,3'-diphenyl tetracarboxylic dianhydride
2,2-bis (3,4-dicarboxyphenyl)propane dianhydride
perylene 3,4,9,10-tetracarboxylic acid dianhydride
pyromelliticetetranitrile
tetracyanoethylene
tetracyanoquinone dimethane.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. The method of making an oxygen electrode suited for use in a fuel cell with an acidic electrolyte comprising dissolving 10 to 30 parts by weight of a metal phthalocyanine in concentrated sulfuric acid, adding 10 to 40 parts of a finely divided carbon or gold and causing precipitation of the solute onto the carbon or gold by dilution of the sulfuric acid, drying the mass and mixing it with 5 to 20 parts of an organic thermoplastic polymer as binder and 20 to 70 parts of a pore-forming material and subjecting the dry mixture to heat and pressure followed by leaching out of the pore-forming material.

2. The method of claim 1 wherein the metal phthalocyanine is a $Co^{II}$-, $Fe^{II}$-, $Fe^{III}$-, $Ni^{II}$-, $Cr^{III}$-, $Mn^{II}$-, $Mn^{III}$-, $Pd^{II}$-, or $Pt^{IV}$ phthalocyanine.

3. The method of claim 2 wherein the metal phthalocyanine is a polymeric metal phthalocyanine.

4. The method of claim 3 wherein the polymeric metal phthalocyanine has a molecular weight above 1,000 and a polymerization degree of at least 3.

5. The method of claim 1 wherein the said precipitation is caused by diluting the concentrated sulfuric acid with water.

6. The method of claim 3, wherein the phthalocyanine is obtained by reacting a tetra-functional compound selected from the group consisting of tetra-functional aromatic nitriles and tetra-functional acid anhydrides with urea and a cobalt salt followed by heat treatment to polymerize the reaction product.

7. A method as defined in claim 6, wherein said tetrafunctional compound is selected from the group consisting of pyromellitic acid dianhydride, 3,3',4,4'-diphenyl tetracarboxylic acid dianhydride, 1,2,5,6 - naphthalenetetracarboxylic acid dianhydride, 2,2',3,3'-diphenyl tetracarboxylic acid dianhydride, 2,2-bis (3,4-dicarboxyphenyl)propane dianhydride, perylene 3,4,9,10-tetracarboxylic acid dianhydride, pyromellitic acid tetranitrile, tetracyano-ethylene and tetracyanoquinone dimethane.

8. The method of claim 1, wherein the carbon is acetylene black.

References Cited

UNITED STATES PATENTS

| | | | |
|---|---|---|---|
| 3,410,727 | 11/1968 | Jasinski | 136—86 |
| 3,585,079 | 6/1971 | Richter et al. | 136—120 FC |
| 3,097,116 | 7/1963 | Moos | 136—120 FC |
| 3,177,097 | 4/1965 | Beals | 136—86 DD |
| 3,385,736 | 5/1968 | Deibert | 264—49 X |
| 3,068,311 | 12/1962 | Chambers et al. | 136—86 |

FOREIGN PATENTS

| | | | |
|---|---|---|---|
| 935,415 | 8/1963 | Great Britain | 136—120 FC |

OTHER REFERENCES

Drinkard, William C. and John C. Bailer: "Copper Phthalocyanine Polymers," in Journal of the American Chemical Society, vol. 81, Sept. 20, 1959, pp. 4795–4797.

Jasinski, Raymond: "Cobalt Phthalocyanine as a Fuel Cathode," in Journal of the Electrochemical Society, vol. 112, May 1965, pp. 526–528.

ANTHONY SKAPARS, Primary Examiner

U.S. Cl. X.R.

264—49